Aug. 21, 1928.
T. H. WILLIAMS
SHOCK ABSORBER
Filed Oct. 4, 1926
1,681,205
2 Sheets-Sheet 1
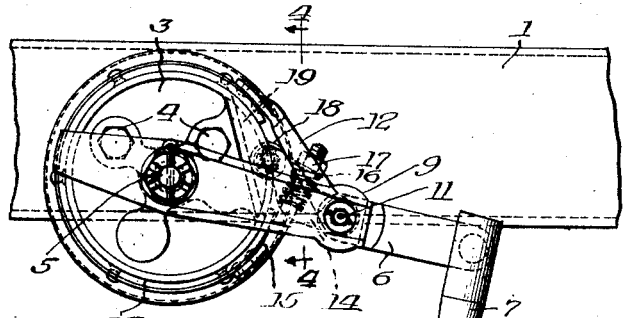
Fig.1
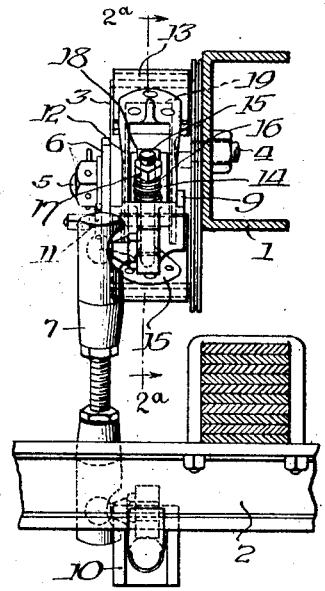
Fig.2
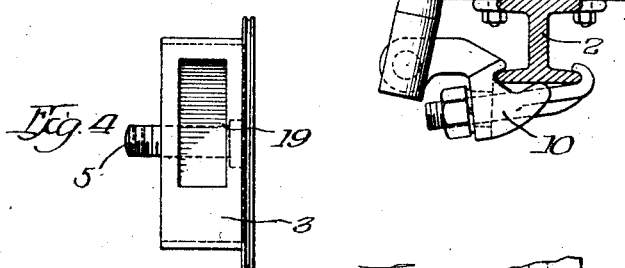
Fig.4
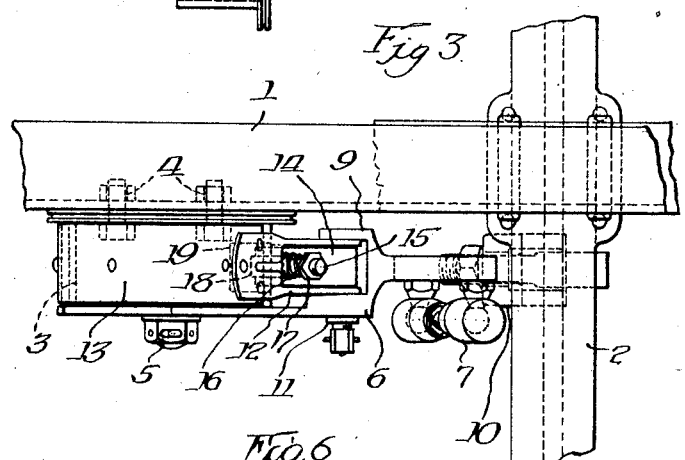
Fig.3
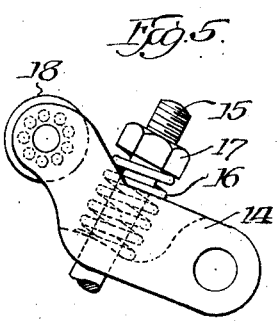
Fig.5
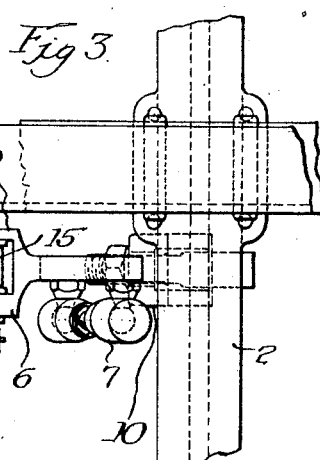
Fig.6
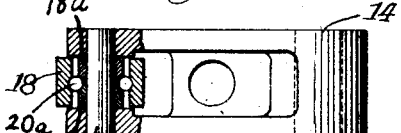
Witness:
Geo. C. Larson
Inventor:
Theron H. Williams
By Ira J. Wilson
Atty.

Aug. 21, 1928.
T. H. WILLIAMS
1,681,205
SHOCK ABSORBER
Filed Oct. 4, 1926
2 Sheets-Sheet 2
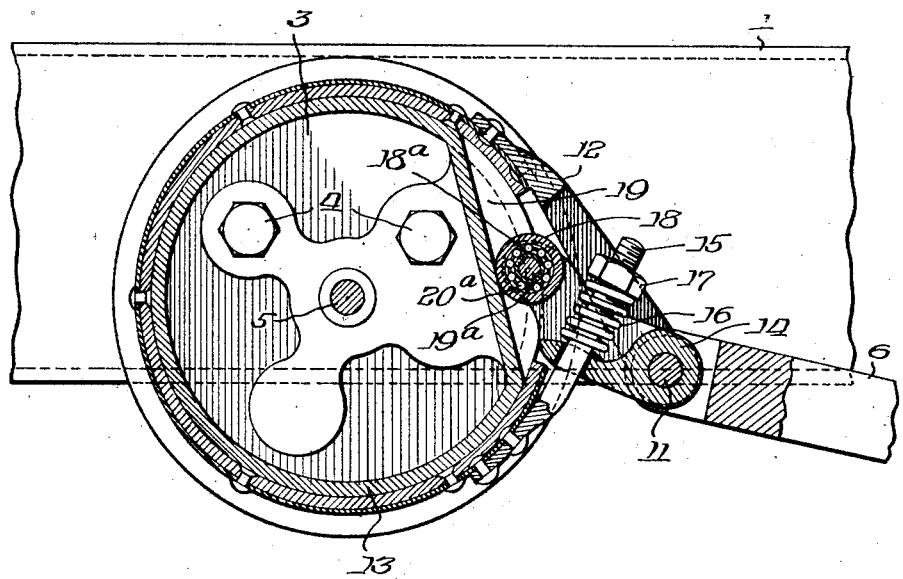
Fig. 2a
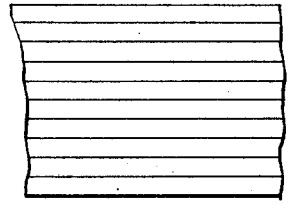
Witness:
Inventor
Theron H. Williams
By Ira J. Wilson
Atty Patented Aug. 21, 1928.

1,681,205

UNITED STATES PATENT OFFICE.

THERON H. WILLIAMS, OF CHICAGO, ILLINOIS.

SHOCK ABSORBER.

Application filed October 4, 1926. Serial No. 139,298.

This invention relates to shock absorbers of the type used on vehicles for retarding the relative movement of the running gear away from normal position with respect to the vehicle frame or chassis and contemplates the provision of a simple and rugged shock absorber capable of retarding such movement substantially proportional to the extent thereof from normal position in either direction, the increase in retarding action becoming effective more quickly when the running gear is moving downwardly than when the same is moving upwardly relative to the chassis and permitting a slight amount of normal oscillation without material increase in retardation.

Other important features of this invention will be apparent as the same becomes better understood from an examination of the specification and claims in connection with the accompanying drawings, wherein Fig. 1 is a fragmentary side elevation of a shock absorber embodying this invention connected between the chassis and running gear of a vehicle.

Fig. 2 is a fragmentary end view partly in section of the same.

Fig 2a is a fragmentary sectional view taken at the line 2a—2a in Fig. 2 and showing parts in elevation.

Fig. 3 is a fragmentary plan view of the same.

Fig. 4 is a detail view of the drum removed and as viewed along the line 4—4 of Fig. 1, and Fig. 5 is an enlarged detail view showing one of the parts of the mechanism removed.

Fig. 6 is a section through the ball-bearing roller shown in Fig. 2a.

Referring to the drawings more particularly, numeral 1 represents the chassis of a vehicle to which is secured in the usual manner and for relative movement with respect thereto, an axle 2 which forms a part of the running gear. A cylindrical casting or drum 3 is bolted to the chassis 1 through suitable bolts 4 and nuts therefor. The drum 3 has pivoted to the center thereof through means of a fulcrum bolt or trunnion 5 and nut therefor, a lever 6 the outer end of which is pivoted to the upper end of an adjustable link 7 which is similar to that shown in connection with my copending application, Serial No. 104,521, for shock absorber, filed April 26, 1926. The lower end of adjustable link 7 is connected to a clamp 10 adapted to be rigidly connected to the axle 2 and also of the type shown in my said copending application. The other end of the lever 6 extends in a direction opposite the first end to a point beyond the periphery of the drum 3 to afford a means for preventing the friction band, which will be described hereinafter, from working off said drum.

The lever 6 is provided with a transversely spaced lug 9, which acts to support the inner end of a transverse pin 11 extending through said lever and on which is pivotally mounted a bifurcated terminal 12 of the upper end of a friction band 13 which surrounds the drum 3. A carriage 14 has one end thereof pivotally mounted on the pin 11 between the arms of the bifurcated terminal 12 and has connected thereto intermediate its ends a terminal 15 of the other end of the band 13. The terminal 15 consists principally of a bolt which slidably extends through the under side of the carriage 14 and which is provided with a helical spring 16, one end of which abuts a shoulder on the upper side of the carriage 14 and the other end of which abuts a nut 17 threaded on the end of the bolt 15. The inner end of the carriage 14 is forked to support a ballbearing roller 18 which rides in a flattened portion or groove 19 on the drum 3. The roller 18 is preferably provided with an inner bearing ring formed of two complementary rings 18a which are rigidly secured to the forked portion of the carriage 14 by a pin 19a, said roller itself acting as the outer bearing ring with the ball bearings 20a tracking between the inner and outer rings in suitable tracks formed therein. The inner bearing is preferably formed of two separate rings 18a to facilitate assembly. The groove 19 is sufficiently wide to accommodate the roller 18 and the end of the carriage 14.

The carriage or link 14 is in effect a first class lever with the pull of the band intermediate its ends. Thus the pull of the lever end of the band is divided between the ends of the carriage or link, the ball bearing 18 taking about half of the strain and the pivot of the link the other half. For this reason the pivot need not be excessively large and is not subject to excessive wear.

In the operation of the shock absorber the lever 6 is swung in proportion to the extent of relative movement of the axle 2 away from normal position in either direction, the direction in which the axle 2 is traveling governing the direction in which the lever 6 will be pivoted. As the lever 6 is swung in accordance with the relative movement of the axle the band 13 will oscillate with said lever. It will be noted that the carriage 14 affords a contractable connection for one end of the band 13 so that as the lever 6 is swung about the fulcrum 5 in either direction the roller 18 as it travels away from the center of the groove 19 in either direction will pivot the carriage 14 in a clockwise direction, thus increasing the tension of the band about the drum and retarding the movement of the axle 2. The roller 18, when the axle 2 is in normal position, is near the center of the groove 19 so that any appreciable abnormal movement between the axle 2 and chassis 1 will cause the carriage 14 to be pivoted in a clockwise direction. It will be noted, however, that as the roller 18 travels for a short space on either side of the center of the groove 19 there will be no appreciable pivotal movement transmitted to the carriage 14 so that there is practically no increase in retarding effect except when abnormal relative movements between the running gear and chassis take place. The normal position of the roller 18 is a little below the center of the groove 19 so that the increase in retarding effect will take place more readily when the axle 2 is moving downwardly relative to the chassis 1 than when said axle is moving upwardly relative to said chassis because it is desirable to check the abnormal movements of the running gear more quickly below normal position than above, as for instance, when the wheels of the vehicle drop in a hole.

It will be observed that the aforedescribed shock absorber is very rugged and adapted to withstand the exigencies of the service demanded of it, that the contractable connection between the lower end of the band 13 and the lever 6 will operate to increase the friction between said band and the drum 3 in proportion to the extent of abnormal relative movement between the running gear and the chassis, and that the roller 18 being normally in a position a little below the center of the groove 19 the increase in retarding effect will take place more quickly when the running gear moves downwardly from its normal position than when it moves upwardly relative to the chassis.

I am aware that many changes may be made and many details of construction varied without departing from the principles of this invention, and I do not wish to be limited to the details shown and described.

I claim:

1. A shock absorber adapted to retard the relative movement between two parts of a vehicle, comprising a curved friction member on one of said parts, a band engaged by said member, means connected to the other part for rotating said band in accordance with such movement, said friction member having cam means associated therewith, and means operable upon the rotation of said band and controlled by said cam means for increasing the friction between said member and band in accordance with the rotational movement thereof in either direction.

2. A shock absorber adapted to retard the relative movement between two parts of a vehicle, comprising a curved friction member on one of said parts, a band engaged over said member, and means connected to the other part for rotating said band in accordance with such movement, said band having a rectractable connection between one end thereof and said means for varying its tension about said friction member, the latter having a cam formed on its outer periphery for controlling said connection in accordance with the rotational movement of said band.

3. A shock absorber adapted to retard the relative movement between two parts of a vehicle, comprising a curved friction member on one of said parts, a band engaged over said member, means connected to the other part for rotating said band in accordance with such movement, and cam means associated with said member, one end of said band being secured to said first means through means of a link, said end joining said link intermediate the ends thereof, said link being pivoted at one end to said first means and having its other end in engagement with said cam, the latter being adapted to pivot said link in accordance with the relative movement of said parts.

4. A shock absorber adapted to retard the relative movement between two parts of a vehicle, comprising a curved friction member on one of said parts, a band engaged over said member, and means connected to the other part for rotating said band in accordance with such movement, said band having a retractable connection to one end thereof for varying the tension thereof about said friction member, the latter having a flat portion formed on its outer periphery for controlling said connection in accordance with the rotational movement of said band.

5. A shock absorber adapted to retard the relative movement between two parts of a vehicle, comprising a curved friction member on one of said parts, a band engaged over said member, and means connected to the other part for rotating said band in accordance with such movement, said band having one end thereof connected to said first means through a link, said end being secured to said link intermediate the ends thereof, said link being pivoted at one end to said means, said friction member having a flat portion, the other end of said link being in engagement with said portion and adapted to be pivoted thereby in accordance with the rotational movement of said band.

6. A shock absorber adapted to retard the relative movement between two parts of a vehicle, comprising a curved friction member on one of said parts, a band engaged over said member, and means connected to the other part for rotating said band in accordance with such movement, said band having a contractable connection to one end thereof for varying the tension thereof about said friction member, the latter having a flat portion thereon for controlling said connection in accordance with the rotational movement of said band, the contractable connection being normally in engagement with said flat portion at a position a little to one side of the center thereof when the said parts are in normal position whereby said connection will act to increase the tension on said band when said parts move in either direction from normal position and will take effect more quickly when the said parts are moving in one direction from normal than when they are moving in the other direction from normal.

7. A shock absorber adapted to retard the relative movement between two parts of a vehicle, comprising a curved friction member on one of said parts, a band engaged over said member, and means connected to the other part for rotating said band in accordance with such movement, said band having one end thereof connected to said means through means of a link and being secured to said link intermediate the ends thereof, said link being pivoted at one end to said means, said member having a flat portion, the other end of said link being in engagement with said flat portion for pivoting said link in accordance with the rotational movement of said band, said link being normally in engagement with said flat portion at a position appreciably to one side of the center thereof when the said parts are in normal position.

8. A shock absorber adapted to retard the relative movement between two parts of a vehicle, comprising a curved friction member on one of said parts, a band engaged by said member, a lever pivoted adjacent said friction member having one end linked to the other of said parts for rotating said band in accordance with such movement and the other end extending adjacent the periphery of the curved member to act as a guide for preventing said band from working off said member, and means for increasing the friction between said member and band in accordance with the rotational movement thereof.

9. A shock absorber adapted to retard the relative movement between two parts of a vehicle, comprising a curved friction member on one of said parts, a band engaged by said member, means connected to the other part for rotating said band in accordance with such movement, said member having a flat portion thereon, and means operable upon the rotation of said band and controlled by said flat portion for increasing the friction between said member and band when said parts move in either direction away from normal position.

10. A shock absorber adapted to retard the relative movement between two parts of a vehicle, comprising a substantially round friction member on one of said parts, a band surrounding said member, means connected to the other part for rotating said band in accordance with such movement, said member having a flat portion thereon, and means normally engaging said flat portion and operable upon the rotation of said band for increasing the friction between said member and band when said parts move in any direction away from normal position, said last means being adapted to ride away from the center of said flat portion when said movement is abnormal and to approach the center of said portion when said movement approaches normal.

11. A shock absorber adapted to retard the relative movement between two parts of a vehicle, comprising a curved friction member on one of said parts, a band engaged over said member, means connected to the other part for rotating said band in accordance with such movement, and cam means associated with said member, one end of said band being secured to said first means by a link, said end joining said link intermediate the ends thereof, said link being pivoted at one end to said first means and having a ball bearing roller on its other end normally in engagement with said cam, the latter being adapted to pivot said link in accordance with the relative movement of said parts.

12. A shock absorber adapted to retard the relative movement between two parts of a vehicle, comprising a curved friction member on one of said parts, a band engaged by said member, and means connected to the other part for rotating said band in accordance with such movement, said band having a retractable connection at one end thereof for varying its tension about said friction member, the latter having cam means associated therewith for controlling said connection in accordance with the rotational movement of said band, said connection including a roller provided with an anti-friction bearing adapted to be engaged by said cam for effecting such control.

13. A shock absorber adapted to retard the relative movement between two parts of a vehicle, comprising a curved friction member on one of said parts, a band engaged over said member, and means connected to the other part for rotating said band in accordance with such movement, said band having a retractable connection between one end thereof and said means for varying its tension about said friction member, the latter having cam means associated therewith for controlling said connection in accordance with the rotational movement of said band, said connection including a lever operable to contract said connection and a roller provided with an anti-friction bearing mounted at one end of said lever and adapted to be engaged by said cam means for effecting such control, said roller forming the outer race for the bearing and having an inner race rigidly secured to said lever.

14. A shock absorber adapted to retard the relative movement between two parts of a vehicle, comprising a curved friction member on one of said parts, a band engaged over said member, means connected to the other part for rotating said band in accordance with such movement, a cam associated with said member, and a link connecting one end of said band with said means, said link being pivotally connected to said means, the pivot therefor being without the periphery of said friction member, the cam being adapted to pivot said link in accordance with the relative movements of said parts for increasing the tension on said band in accordance with said relative movement.

15. A shock absorber adapted to retard the relative movement between two parts of a vehicle, comprising an annular friction member on one of said parts, the periphery of said member being continuous, a band engaged over said member, and means connected to the other part for rotating said band in accordance with such movement, said band having a contractable connection between one end thereof and said means for varying its tension about said friction member, the latter having a cam associated therewith for controlling said connection in accordance with the rotational movement of said band.

16. A shock absorber adapted to retard the relative movement between two parts of a vehicle, comprising a curved friction member on one of said parts, a band engaged over said member, means connected to the other part for rotating said band in accordance with such movement, and cam means associated with said member, said rotating means including a rockable link joining one end of said band intermediate the ends of the link, one end of the link being connected to said means and the other end adapted to engage said cam whereby a force exerted on said band by said rockable link will be equivalent to the combined forces acting on the ends of said link.

In witness of the foregoing I affix my signature.

THERON H. WILLIAMS.